United States Patent [19]

Wester et al.

[11] Patent Number: 5,108,620
[45] Date of Patent: Apr. 28, 1992

[54] PROCESS FOR RECOVERY OF SPENT ETCHANT

[75] Inventors: Gary R. Wester, Florissant; Bill W. Moore, Ballwin, both of Mo.

[73] Assignee: Spectrulite Consortium, Inc., Madison, Ill.

[21] Appl. No.: 547,835

[22] Filed: Jul. 3, 1990

[51] Int. Cl.$^5$ .............................................. C02F 1/62
[52] U.S. Cl. ................................... 210/725; 210/727; 210/912; 210/729; 210/732
[58] Field of Search ............... 210/912, 725, 726, 727, 210/728, 729, 732, 730, 724; 204/DIG. 13; 423/101, 102, 566.1

[56] References Cited

U.S. PATENT DOCUMENTS

| | | |
|---|---|---|
| 2,938,046 | 5/1960 | Morehouse . |
| 3,102,808 | 9/1963 | Weisberg et al. . |
| 3,438,901 | 4/1969 | Vassileff . |
| 3,816,306 | 6/1974 | Roy . |
| 3,843,504 | 10/1974 | Nayder . |
| 3,849,218 | 11/1974 | Beckwith et al. . |
| 3,953,306 | 4/1976 | Lancy . |
| 3,966,601 | 6/1976 | Stevenson et al. ................. 210/710 |
| 4,033,764 | 7/1977 | Colegate et al. . |
| 4,180,469 | 12/1979 | Anderson . |
| 4,233,111 | 11/1980 | Valayil et al. . |
| 4,482,377 | 4/1984 | Heins . |
| 4,578,195 | 3/1986 | Moore et al. . |
| 4,670,160 | 6/1987 | Moriya et al. . |
| 4,678,584 | 7/1987 | Elfline . |
| 4,731,187 | 3/1988 | Moriya et al. . |
| 4,762,691 | 8/1988 | Miyazaki et al. . |
| 4,765,834 | 8/1988 | Ananthapadmanabhan et al. . |
| 4,802,993 | 2/1989 | Katoh . |
| 4,957,634 | 9/1990 | Bowers, Jr. .................... 210/912 |

OTHER PUBLICATIONS

*Environmental Analysis*, Ed. Galen Ewing, Academic Press, Inc., New York, N.Y., 1977, 253-265.
*Anal. Chem.*, 1982, 54, 2536-2539.
*Plating and Surface Finishing*, Jan. 1982, 66-71.

*Primary Examiner*—Stanley S. Silverman
*Assistant Examiner*—Neil M. McCarthy
*Attorney, Agent, or Firm*—Kalish & Gilster

[57] ABSTRACT

A chelation process and apparatus for treating an acid solution, namely nitric acid photoengraving etchant, having a high concentration of magnesium and having a heavy metal contaminant produced by zinc leached during etching. The process requires adjusting pH of a batch quantity of the etch solution to a value permitting chelating to occur and mixing carbamic sodium salt hydrate chelating agent with the solution in quantity sufficient to cause precipitation from the solution of a carbamic salt compound precipitate of the contaminant, and separating the precipitate from the remaining solution by filter press for removal from the solution for safe environmental disposal. The remaining liquor is safely sewered. The apparatus is mobile for use on photoengraving premises.

21 Claims, 2 Drawing Sheets

FIG. I 5,108,620

PROCESS FOR RECOVERY OF SPENT ETCHANT

BACKGROUND OF THE INVENTION

This invention relates to the treatment of aqueous effluents and, more particularly, to a process for treatment of spent acid etch solution, particularly acid solutions having heavy-metal contaminants by reduction of the heavy metal zinc from such etchant to levels safe for discharge.

As regulatory rules for waste stream effluent become more stringent, a method to remove heavy metals becomes mandatory. Currently, magnesium photoengraving plate is etched in a solution containing nitric acid and an organic additive. Typically, the magnesium sheet contains by weight three percent (3%) aluminum and one percent (1%) zinc with other impurities being less than 0.05 percent (0.05%). As the magnesium sheet is processed in the etch bath, aluminum, zinc, magnesium and minor impurities are leached into the acid bath. The spent acid bath generally contains 50,000 ppm magnesium and 500 ppm zinc. While a locality may allow a discharge of 5 ppm zinc, national or other governmental regulations may establish a discharge limit which is more restrictive, e.g., less than 2 ppm.

An acceptable practice, currently in use at many locations, for removing zinc ions from the etch solution involves the addition of sodium hydroxide. The hydroxide ion neutralizes the acid and, by raising the pH above 9.2, insoluble zinc hydroxide is formed. Solids can be removed from a hydroxide treated bath by either settling and decanting the supernant (aqueous layer without solids) or by filtration. Such a hydroxide precipitation method of zinc removal is complicated by simultaneous precipitation of most of the dissolved magnesium, which is not a target metal, thereby adding significantly and undesirably to the volume of solids of which are to be disposed.

SUMMARY OF THE INVENTION

The use of sodium dimethyldithiocarbamate (DTC) in accordance with the present invention, as proposed herein, may be used to reduce the volume of solids to be disposed of while simultaneously reducing the zinc level below 2 ppm in this nitric acid etchant. The mechanism by which such a chelating agent accomplishes this is by specifically chelating with the family of metal ions (zinc [II], silver [I], copper [II], lead [II], cadmium [II], manganese [II]) at low pH values. By this controlled precipitation, the magnesium ions are left virtually untouched in the etchant solution. The filtration of the solids from the DTC etchant and the neutralization of etchant solution to accommodate disposal levels have created a disposal system in which material, upon being analyzed, is found to be suitable for disposal in public landfills.

Accordingly, it is among the objects of the invention to provide an improved process for treatment of zinc-contaminated acid solution, specifically spent etchant, and specifically such a process capable of separating a heavy metal contaminant from such an acid solution, i.e., from etchant in such a way as to precipitate the zinc from the etchant by chelating, to levels suitable for disposal in public landfills.

It is also an object of the invention to provide an improved system, including portable apparatus, for carrying out such a process.

It is a further object of the invention to provide such a system and process capable of reducing zinc concentrations in spent etchant to levels typically required by governmental regulations, and even to levels of less than 2 ppm.

It is a further object of the invention to provide such a system and process which, as utilized to treat spent etchant of the type specifically used for etching of magnesium sheet which includes aluminum and zinc; and which obviates separate removal of dissolved magnesium, thereby allowing safe discharge of an aqueous solution of magnesium and other non-objectional impurities, while safely lowering zinc concentrations to extremely low levels. A further object of the invention is to provide a process and system for safe heavy metal containment removal from an acid solution which allows use of a single chelating agent for both removal of the contaminant and neutralization of the solution.

Briefly, the foregoing objects are achieved by a process for treating an acid solution having a heavy metal contaminant to remove the contaminant from the solution for safe environmental disposal. The process adjusts the pH of a quantity of the solution to a value permitting chelating to occur and involves mixing carbamic sodium salt hydrate chelating agent with the solution in quantity sufficient to cause complete precipitation of the contaminant from the solution as a carbamic salt compound precipitate of the contaminant. As a result, the precipitate becomes separated from the remaining solution.

GENERAL DESCRIPTION OF METHODOLOGY

For photo-engraving of magnesium sheet, etching thereof is carried out in an etching solution of 14%-22% (by weight) nitric acid with a filming agent additive. Typically, the magnesium sheet contains 1% zinc which, during the developmental process, leaches into the etchant bath. The etch solution is considered exhausted or "spent" etch solution when it contains 50,000 ppm magnesium and 500 ppm zinc.

Figure 1:
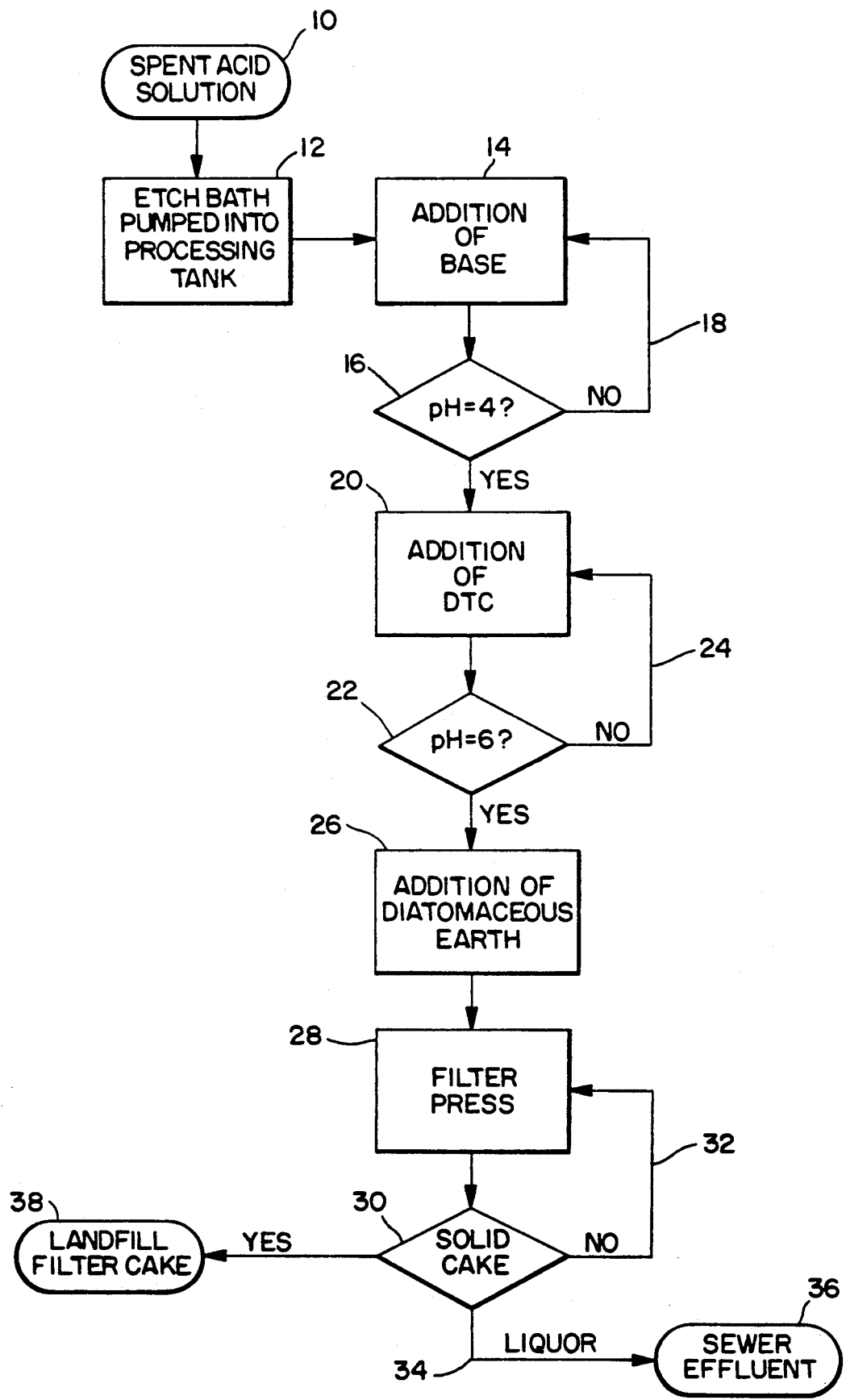
FIG. 1 is a flow diagram of a process according to the present invention.

Referring now to the drawings, a process of the invention is illustrated in the form of the process flow diagram of FIG. 1.

The general methodology of FIG. 1, and pH levels set forth therein are exemplary and illustrative only.

A spent etchant solution such as used for having etched such magnesium photoengraving plates typically contains 3% by weight of aluminum and 1% by weight of zinc with other impurities in negligible concentrations is provided to the system at 10.

For treatment according to the invention, the spent etchant is transferred, as at 12 into a processing vessel for treatment.

At 14, a basic solution is added to the processing vessel in such an amount so as to achieve a predetermined pH level, that is, to a value permitting chelating of the zinc to occur by use of a carbamic sodium salt hydrate. The pH as a minimum should be 2.5, more preferably at least be 3.5 and most preferably a pH of at least 4 (but not more than above 6), as shown at step 16.

If the pH has not yet reached 4, for example as indicated at process step 18, additional basic solution is added until the pH level is 4. At step 20, a selected carbamic sodium salt hydrate chelating agent in accordance with the invention is then added to the processing tank in at least stoichiometric amount, preferably up to about 15% more, for causing substantially complete chelation of the zinc, as a typical sulfide precipitated metal ion, by precipitation from the solution as a carbamic salt compound zinc precipitate. For this purpose, the chelating agent is stirred into the solution. Zinc ions are, of course, held in suspension in the processing tank. Stirring may be carried out continuously over a predetermined interval.

Then, at step 22, the pH of the solution is again adjusted to a predetermined level corresponding to predetermined effluent limits for pH, e.g., of 6, as by adding additional sodium hydroxide solution. If the pH is not yet up to a level of 6, for example, as shown at step 24, additional basic solution is added, and further stirring take place. When the pH level is at the predetermined level, a preselected quantity of a flocculating or filtering aid, e.g., diatomaceous earth, is added to the pH-adjusted solution, as at step 26. The suspended solution is then transferred at step 28 to a filter press.

Using such a filter press, the aqueous solution is filtered to remove solids by retaining the suspended solids in the filter cake. After cycling, the filter press is checked at 30 to determine if a solid cake has resulted from the suspended solids. If not, a further cycling is carried out as shown at 32 until a solid cake results.

After the filter cake has reached a predetermined density and size, the liquor is discharged, as at 34, from the process and sewered or otherwise suitably disposed of as at step 36. The filter cake of zinc compound of the carbamate salt dries to a flake form, and then is transferred, as at 38, to a landfill.

DETAILED PREFERRED PROCESS DESCRIPTION

Etchant for such photoengraving conventionally consists of a 14% to 22% nitric acid solution with a 5% by weight oil additive or filming agent. During the processing this solution is sprayed on the magnesium plate and etches away magnesium alloy not protected by the photoresist compound. It is at this period that metallic ions are leached into the etching solution. The typical composition of the magnesium sheet used in this process is found in Table 1.

TABLE 1

Percent chemical composition of photoengraving magnesium sheet.

|  | Al | Zn | Ca | Ni | Fe |
|---|---|---|---|---|---|
| Nominal | 3.1 | 1.0 | 0.02 | 0.0007 | 0.008 |
| Upper limit | 4.0 | 1.6 | 0.04 | 0.0050 | 0.010 |
| Lower limit | 2.5 | 0.7 | 0.0 | — | — |

The etchant bath, strongly a nitric acid solution having a pH typically 0.5–1, but possibly approaching zero, may be considered exhausted when its magnesium content as determined by weight loss measurement reaches 1.5 ounces magnesium per liter of solution. Corresponding zinc levels in this solution usually exceed 250 ppm and typically range up to 500 ppm. Also present in the spent acid solution in an appreciable quantity is aluminum. Copper ions are typically less than 0.05% by weight. To process a spent acid etch solution, the etch solution is transferred to the reaction vessel via a chemical transfer pump capable of withstanding extremely low pH solutions, or by siphoning. On completion of this transfer, power is supplied to a mixer for the vessel and pH controller fitted to the vessel as later described.

A solution of neutralizing material is fed into the reaction vessel, while the spent acid solution is stirred by the mixer, until a predetermined pH 4 is obtained. Such pH may be in the generally preferred range of from 2.5 to 6, and a pH of 4 being most specifically preferred.

The neutralization solution may be selected from the group consisting of sodium hydroxide, sodium acetate and magnesium hydroxide, as well as mixtures thereof, such as a mixture of a 50% solution of sodium hydroxide or a 50% solution of sodium acetate. Then a 40% to 50% solution of dimethyldithio-carbamic acid (dimethyldithiocarbamate) ("DTC"), a sodium salt trihydrate having the formula $(C_2H_5)_2NCS_2Na \cdot 3H_2O$, is added to the reaction vessel according to the following specifically preferred criteria, based upon an assumed zinc concentration of 0.5 g zinc/liter of solution:

liters DTC = (0.0075 liters DTC/liters etch
solution) × (liters of etch solution)          (Formula 1)

Formula 1 provides for addition of DTC in amount based on such a zinc level, and for an additional amount of about 10% by weight. At least a stoichiometric amount of DTC is added to achieve salient objects of the invention.

The etch solution and added DTC, are allowed to react for at least one-half hour and preferably about one hour, after which time the DTC will have chelated the aqueous zinc and the pH value will have risen from 4.0 to about 7.0. If the pH is less than 6.0, an additional amount of either sodium hydroxide (or an alternative neutralizing solution being used for the treatment process) or DTC must be added to adjust the pH to a minimum of 6.0. If additional DTC is added, the mixture must be again stirred for one hour. The pH is then finally adjusted with base or acid to achieve a final pH disposal value, namely a minimum pH of at least 6, and not more than a pH of about 7.

Diatomaceous earth is added to the reaction vessel as a filtering aid according to the following formula (based upon an assumed zinc concentration of 0.5 grams per liter and 130 L. of etch solution):

(lbs. diatomaceous earth) = (0.045 lbs. diatomaceous
earth/liters) × (liters of etch solution treated)     (Formula 2)

An alternative filtering aid can be an anionic polymer. An example is polyacrylamide.

The resultant slurry is allowed to mix for at least about 5 minutes before starting a cycle of the filter press (28). The filter press pump is started at 25 psi until pump cycle time has averaged out to about 0.5 min. Pressure is in increased 25 psi increments each time the pump cycle time has averaged out to about 0.5 min. until a total pressure of 100 psi is attained. When pump cycle time is one minute at 100 psi, the filter press cycle is considered finished. Air to the filter press pump is turned off and an air blowdown on filter press is performed at 40 psi for 10 to 15 minutes. The filter press is allowed to equalize to barometric air pressure before opening. The press is opened and the filter cake, believed to be bis(methylcarbamodithioato-S,S′)zinc, is removed for disposal in approved landfill or as appropriate.

Alternatively, the pH of the solution may be raised by direct use of DTC, a strong base, without resort to a separate neutralizing solution, at least to the minimum value of about 2.5 which permits chelation to occur, but more preferably at least 3.5, and most preferably 4, as by adding at the outset at least to a stoichiometric amount of the DTC, which will cause corresponding increase in pH; additional DTC may then be added to raise the pH still further to the preferred minimum; and ultimately to the safe pH level for discharge of the liquor.

Before allowing effluent to be discharged, outflow from filter press is checked for zinc concentration using prescribed methods for zinc determination, and the effluent, being an environmentally benign liquor in the form of a magnesium solution at safe pH levels, may be sewered safely.

The following examples illustrate variations in the above-described methodology in accordance with the invention.

EXAMPLE 1

A test quantity of 500 ml of nitric acid etch solution containing 12,000 ppm magnesium, 400 ppm aluminum and 120 ppm zinc is treated by the above process. After raising the pH to 4 with a 50% sodium hydroxide solution, 7.5 mls of a 45% solution of DTC are added to the solution and stirred for one hour and then filtered. The analysis of the remaining solution for dissolved metals shows 11,500 ppm magnesium, 49 ppm aluminum and 0.9 ppm zinc. The amount of suspended solids increases during treatment from 445 ppm to 4650 ppm, as increased by filtration before and after. The resulting effluent thus has a zinc concentration well within governmental guidelines of 2.7 ppm maximum for effluent.

EXAMPLE 2

A batch quantity of 130 liters of an exhausted etch solution, namely a whole exhausted etchant bath, containing 55,000 ppm magnesium, 630 ppm aluminum and 559 ppm zinc, is treated with a 50% solution of sodium hydroxide until a pH of 4 is obtained. Two liters of a 45% solution of DTC, corresponding to about 400 g of DTC per liter of DTC solution, are added to the solution and stirred for one hour. A rationale is that if there is zinc concentration of 500 ppm in the spent etchant, 6 ml (±5%) of the DTC solution is added per liter of etch solution to be treated. The analysis of this filtered solution for dissolved metals shows 50,000 ppm magnesium, 78 ppm aluminum and 1.4 ppm zinc. To determine if additional zinc can be precipitated, an additional liter of the 45% solution of DTC is added, stirred, filtered and analyzed. 50,000 ppm magnesium, 48 ppm aluminum and 1.2 ppm zinc are found, thereby demonstrating effective precipitation in the first reaction based upon the rationale.

EXAMPLE 3

In this example, 500 ml of etch solution containing 12,000 ppm magnesium, 400 ppm aluminum and 120 ppm zinc are first treated with a 50% solution of sodium acetate to a pH of 4.5. Then 3.6 ml of a 45% solution of DTC are added and the mixture is allowed to stir for one hour. The analysis of the filtered solution shows approximately 12,000 ppm magnesium, 375 ppm aluminum and 1.2 ppm zinc. Thus, use of sodium acetate as an alternative buffer allows selective chelating of zinc without precipitating aluminum as aluminum hydroxide.

EXAMPLE 4

Without first being neutralized as in Examples 2 and 3, 500 ml etch solution containing 12,000 ppm magnesium, 400 ppm aluminum and 120 ppm zinc are treated with a 329 ml of a 45% DTC solution to a pH of 6, wherein the DTC, a strong base, is used as a combinative agent for both neutralizing the etch solution and chelating. Upon analysis, magnesium and aluminum concentrations are virtually unchanged from Example 3 while dissolved zinc is not detected.

EXAMPLE 5

Under conditions like Examples 1 and 2, 131 L. of an exhausted etch solution containing 55,000 ppm zinc are treated with a 50% solution of sodium hydroxide to a pH of 4. Then 3 liters of a 45% solution of DTC are added to the reaction vessel and stirred for one hour. To minimize filter press clogging by very fine particles of precipitated zinc carbonate, diatomaceous earth is added as a filtering aid in the generally preferred amount of from about 5 to about 20 lb/100 gal. of etch solution, and more preferably in the range of 5–15 lb/100 gal. of etch solution, and most specifically preferred the amount of 6 lb/100 gal. of etch solution. The resultant slurry is stirred for 20 minutes, then filter pressed starting at 25 psi and increasing the pressure in 25 psi increments to 100 psi. The resultant filter cake contains zinc carbamate precipitate with diatomaceous earth. The total cake solids is found to be 51.8% (by weight) with a specific gravity of 1.17 and a wet cake density of 73 lbs/cu.ft. The effluent contains 2.1 ppm zinc. The filter press is a gasketed plate press, total volume of 0.3 cu.ft. Feeding the filter press is a double diaphragm pump. The reaction vessel is a polyethylene 100 gal. tank with a ¼ HP, 4" single prop mixer. pH control is controlled with a pH controller which activates a chemical feed pump for caustic addition.

EXAMPLE 6

Conditions as in Example 5 are carried out but substituted for diatomaceous earth as a filtering aid is an anionic polymer, namely polyacrylamide in the ranges of lb./100 gal. of etchant, as follows:
Generally preferred: about 0.001 lb. to about 0.0025 lb.
Specifically preferred: 0.0012 lb. to 0.0018 lb.
Most preferred: 0.0013 lb.

At the most preferred amount usage, zinc concentration in the effluent is 2.1 ppm.

EXAMPLE 7

A test quantity of 500 ml of nitric acid etch solution containing 12,000 ppm magnesium, 400 ppm aluminum and 120 ppm zinc is treated by the above process. After raising the pH to 4 with a 50% sodium hydroxide solution, 7.5 mls of a 45% solution of sodium diethyldithiocarbamate are added to the solution and stirred for one hour and then filtered. The analysis of the remaining solution for dissolved metals shows 11,500 ppm magnesium, 49 ppm aluminum and 0.9 ppm zinc. The amount of suspended solids increases during treatment from 445 ppm to 4650 ppm, as increased by filtration before and after. The resulting effluent thus has a zinc concentration of 2.7 ppm maximum, well within governmental guidelines for effluent.

Mobile Apparatus of System

Figure 2:
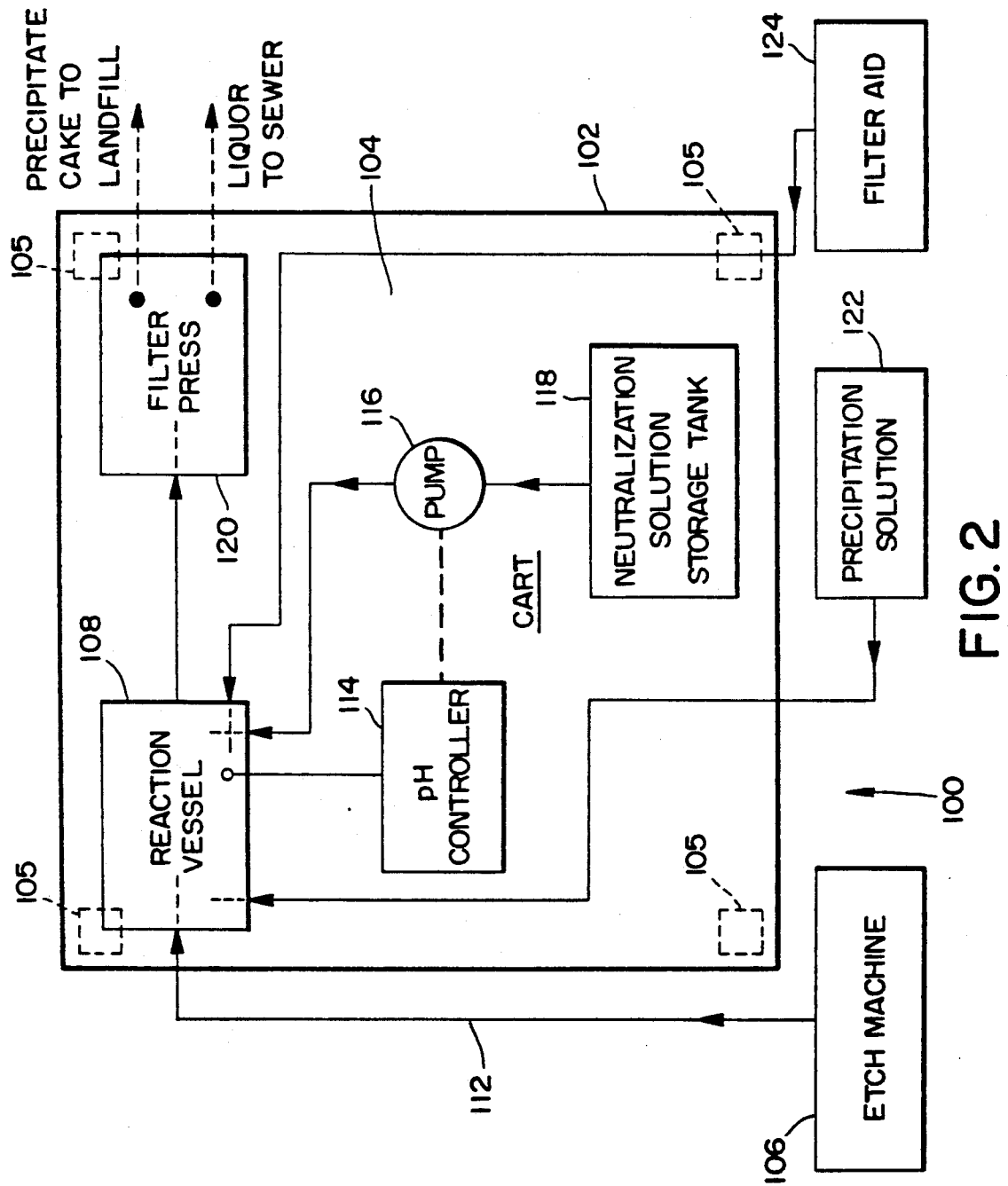
FIG. 2 is a simplified schematic diagram of mobile apparatus as connected with photoengraving etching components to provide a system carrying out the process of FIG. 1.

Referring to FIG. 2, a system apparatus 100 for etch solution treatment according to the above-described methodology comprises a mobile cart 102 shown in schematic, highly simplified plan view. The cart may be of suitable metal or polymer-based structure providing a platform 104 with floor casters (as shown in outline at 105) or the like at its corners for mobile use in a lithography laboratory or shop. In such premises, there are one or more etching apparatus, as at 106, providing lithograph plate etching stations, each holding acid solution in a vessel in quantities of 100-150 liters.

Mounted suitably on platform 104 are a reaction vessel, i.e. processing vessel, 108 of the type described in Example 5, equipped with a stirrer 100, and fitted for receiving spent etchant from the etching apparatus 106, as by a hose 112, for which purpose a suitable pump (not shown) preferably is provided.

On cart 102 are provided a pH controller 114 of the previously described type adapted for sensing the pH of solution in vessel 108 and for automatically selectively energizing and deenergizing a pump 116 for as a function of the sensed pH for transferring neutralization solution from a suitable storage tank 118 (e.g., of polyethylene) as a function of the pH sensed in the solution in vessel 108. Also provided on cart 102 is a filter press 120 of the type noted in Example 5, for receiving treated solution from vessel 108.

For simplicity, associated valves, plumbing, and other conventional components are not shown.

On the etching premises, a supply 122 of the preciptation, e.g., chelating, solution for the process is maintained, as is a supply 124 of the filter aid described in example 5.

The cart, being mobile, may be relocated on premises to a position proximate an etch machine 108 for treatment of its spent etchant according to the foregoing description. After treatment of the etchant as described hereinabove, the precipitate cake is transferred to landfill and the environmentally safe liquor is sewered.

Conclusion

Treatment of spent magnesium photoengraving etchant with a carbamic sodium salt hydrate chelating agent such as DTC (dimethyldithiocarbamate) has been found to be effective in removing zinc from the acid etch bath. Zinc dimethyldithiocarbamate is precipitated or complexed at low pH and removed from the acid etch solution while allowing other innocuous metal ions, primarily magnesium, to pass through the filter press in solution. The most effective pH for such use of DTC has been found to be in the generally preferred range of from about 4 to about 6. While DTC is a fairly strong base and can be used per se to neutralize the acid solution, it is economically more feasible to use sodium hydroxide or sodium acetate to raise the pH of the etch solution before making DTC addition.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A process for treating a spent acid solution which is a spent nitric acid photoengraving etchant used for etching of magnesium alloy photoengraving plates containing magnesium, aluminum and zinc, and the etchant is contaminated by zinc, to selectively remove the zinc from the solution for safe environmental disposal, comprising adjusting the pH of the solution to not less than 2.5 but not exceeding 6; adding to the solution a carbamic sodium salt hydrate precipitating agent selected from the group consisting of diethyldithiocarbamic acid sodium salt and dimethyldithiocarbamic acid sodium salt, said precipitating agent being added in quantity sufficient to completely precipitate the zinc, stirring the solution with said precipitating agent for a period to cause precipitation from the solution of a carbamic salt compound precipitate of zinc; and separating the precipitate from the remaining solution as a waste material, whereby nonprecipitated amounts of said magnesium and aluminum remain in solution.

2. A treatment process according to claim 1 wherein the precipitating agent is dimethyldithiocarbamic acid sodium salt and the precipitate is bis(dimethylcarbamodithioato-S, S') zinc.

3. A treatment process according to claim 1 wherein the step of adjusting the pH of the solution is effected at least in part by adding said precipitating agent.

4. A treatment process according to claim 1 wherein the step of adjusting the pH of the solution is effected by adding a basic substance before adding said precipitating agent.

5. A treatment process according to claim 4 wherein the basic substance is a solution selected from the group consisting of sodium hydroxide, sodium acetate and magnesium oxide.

6. A treatment process according to claim 1 wherein the pH of the solution is adjusted to not less than 3.5.

7. A treatment process according to claim 1 wherein the pH of the solution is adjusted to not less than 4.

8. A treatment process according to claim 1 wherein the step of separation of the precipitate from the solution is effected by using a filter press to convert the precipitate waste material into a filter cake suitable for transfer to a landfill.

9. A treatment process according to claim 8 wherein before using said filter press to convert the precipitate, the pH of the solution in further adjusted to a final pH value safe for sewering of the solution after using said filter press.

10. A treatment process according to claim 8 wherein before using said filter press to convert the precipitate, a filtering aid is added to the solution as a flocculent.

11. A treatment process according to claim 10 wherein the filtering aid is diatomaceous earth.

12. A treatment process according to claim 10 wherein the filtering aid is an anionic polymer.

13. A process for environmentally treatment spent acid etchant solution which is a spent nitric acid photoengraving etchant used for etching of magnesium alloy photoengraving plates containing magnesium, aluminum and zinc, and the etchant is contaminated by zinc resulting from said etching, to selectively remove the zinc from the solution for safe environmental disposal of the etchant and the zinc, comprising adjusting the pH of the solution to not less than 2.5 but not exceeding 6; adding to the solution carbamic sodium salt hydrate precipitating agent selected from the group consisting of diethyldithiocarbamic acid sodium salt and dimethyldithiocarbamic acid sodium salt, said precipitating agent being added in at least stoichiometric quantity for causing substantially complete precipitation of the zinc, stirring the solution with said precipitating agent for a period for causing precipitation from the solution of a carbamic salt compound precipitate of zinc; and separating the precipitate from the remaining solution as a waste material, whereby nonprecipitated amounts of said magnesium and aluminum remain in solution.

14. A treatment process according to claim 13 wherein the precipitating agent in dimethyldithiocarbamic acid sodium salt and the precipitate in bis(dimethylcarbamodithioato-S, S') zinc.

15. A treatment process according to claim 13 wherein the step of adjusting the pH of the solution is effected at least in part by adding said precipitating agent.

16. A treatment process according to claim 13 wherein the step of adjusting the pH of the solution is effected by adding a basic substance to the solution.

17. A treatment process according to claim 16 wherein the basic substance is a solution selected from the group consisting of sodium hydroxide, sodium acetate and magnesium oxide.

18. A treatment process according to claim 13 wherein the pH of the solution is adjusted to not less than 3.5.

19. A treatment process according to claim 13 wherein the pH of the solution is adjusted to not less than 4.

20. A treatment process according to claim 13 wherein the step of separation of the precipitate from the solution is effected by using a filter press to convert the precipitate into a filter cake suitable for transfer to a landfill.

21. A treatment process according to claim 20 wherein before using said filter press to convert the precipitate, the pH of the solution is further adjusted to a final predetermined pH value of from 6 to 7, and after using said filter press, the solution is sewered.

* * * * *

UNITED STATES PATENT AND TRADEMARK OFFICE
CERTIFICATE OF CORRECTION

PATENT NO. : 5,108,620
DATED : April 28, 1992
INVENTOR(S) : Wester, Gary R. and Moore, Bill W.

It is certified that error appears in the above-identified patent and that said Letters Patent is hereby corrected as shown below:

Col. 8, line 49, replace "in" with --is--;

line 59, replace "treatment" with --treating--;

Col. 9, line 16, replace "in" with --is--; and line 17, replace "in" with --is--.

Signed and Sealed this

Fifteenth Day of June, 1993

Attest:

MICHAEL K. KIRK

Attesting Officer      Acting Commissioner of Patents and Trademarks